United States Patent [19]
Gravagne

[11] 3,881,398
[45] May 6, 1975

[54] RECIPROCATING TOOL ATTACHMENT FOR MILLING MACHINE

[76] Inventor: Vincent J. Gravagne, 15 Beverly Way, Wayne, N.J. 07420

[22] Filed: May 8, 1974

[21] Appl. No.: 468,334

Related U.S. Application Data

[63] Continuation-in-part of Ser. No. 294,562, Oct. 3, 1972, abandoned.

[52] U.S. Cl. .................................. 90/96; 29/57
[51] Int. Cl. .............................. B23d 41/08
[58] Field of Search .......... 90/96, 44, 43; 29/57; 408/30, 20; 74/57; 144/35 A

[56] References Cited
UNITED STATES PATENTS

| | | | |
|---|---|---|---|
| 2,122,611 | 7/1938 | Kirby | 144/35 A |
| 2,436,692 | 2/1948 | Greene | 144/35 A |
| 2,567,856 | 9/1951 | Polk | 408/20 |
| 2,579,642 | 10/1951 | Bachman | 74/57 X |

*Primary Examiner*—Gil Weidenfeld
*Attorney, Agent, or Firm*—James J. Cannon, Jr.; James J. Cannon

[57] ABSTRACT

This invention pertains to a tool attachment for milling machines which converts the rotary motion of the spindle of a milling machine to a reciprocating motion of tool bits in the tool attachment. This attachment permits the precise cutting or broaching of specified shapes in pieces of metal and other nonferrous materials by utilization of a dial indicator to indicate precise positioning of the bits.

2 Claims, 9 Drawing Figures

RECIPROCATING TOOL ATTACHMENT FOR MILLING MACHINE

BACKGROUND OF THE INVENTION

This application is a continuation in part of my prior application Ser. No. 294,562, filed Oct. 3, 1972 and now presently abandoned.

A. FIELD OF THE INVENTION

This invention pertains to a tool for cutting specified shapes in pieces of metal or other non-ferrous materials and more particularly to a tool attachment for milling machines for the conversion of the rotary motion of the spindle of a milling machine to a reciprocating motion adapted for operating various tool bits to enable a machinist to cut shapes presently impossible to cut with a conventional milling machine. It utilizes a unique arrangement of tool bits to a dial indicator for positioning of the bits.

B. DESCRIPTION OF THE PRIOR ART

In the prior art, the conventional milling machine, operating primarily with a rotary motion of its spindle propelling a milling cutter attached to the end thereof, is able to mill various shapes from a piece of metal. This rotary motion, however, results in a rounding of corners and edges, a result which is unacceptable for many applications. In order to square off this rounding, it is necessary to use a second operation employing a broaching tool to perform this task by hand. This is particularly undesirable for limited quantity production of prototype parts.

The prior art shows a number of means for the conversion of rotary motion to reciprocating motion in various types of tool attachments. It shows, however, no tool attachments for milling machines which permit the milling machine to perform also the precise broaching operation with a simple attachment of the type herein disclosed. No prior art discloses the novel use of a dial indicator for such an attachment.

An object of the present invention is to provide a simple and inexpensive tool attachment for a milling machine to permit the cutting or broaching of various geometric shapes, thereby extending the capability of the conventional milling machine.

A further object of this invention is to provide a tool attachment for a milling machine which permits the quick and easy interchange of tool bits.

A further object of this invention is to provide a tool attachment for milling machines in which the shaft of the attachment is in line and concentric with respect to a dial indicator which can be used to indicate reference positions.

Another object of this invention is to provide a tool attachment for milling machines which is of simple construction, inexpensive, to manufacture and easy to use.

SUMMARY OF THE INVENTION

The present invention comprises a tool attachment for milling machines, having at its upper end a locking means for attachment to the spindle column of a milling machine and a shaft adapted to engage the collet of a milling machine and to be driven thereby. The rotary motion of the milling machine drives a set of meshed reduction gears which, in turn, drive a cylindrical cam shaft having a helix curve grooved therein for the conversion of rotary motion to reciprocal motion. Slidably fixed within said helix curved groove is a cam roller bearing fixably attached to a trapezoidal shaped ram which moves with a reciprocating motion. Said reciprocating ram has one end adaptable for insertion and locking of tool bits designed to permit the broaching of various shapes to a piece of metal or non-ferrous material. The shaft of attachment is in line and concentric with respect to the reciprocating ram and accomodates a dial indicator which can be used to indicate reference positions. This feature enables the machinist to locate positions with positive accuracy.

DESCRIPTION OF THE PREFERRED EMBODIMENT

Figure 1:
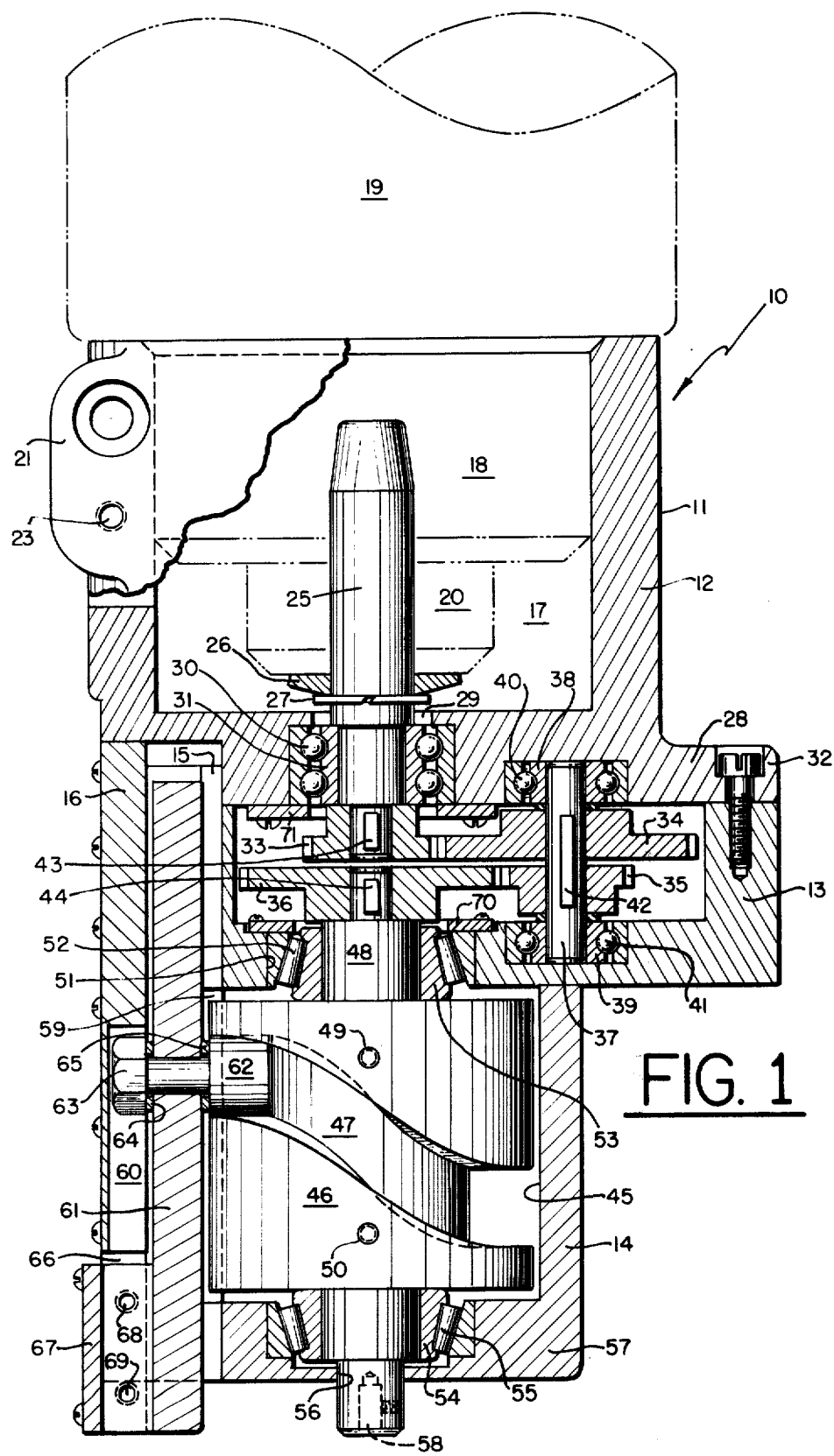
FIG. 1 is a vertical transverse view of the milling machine tool attachment of the present invention.
Figure 2:
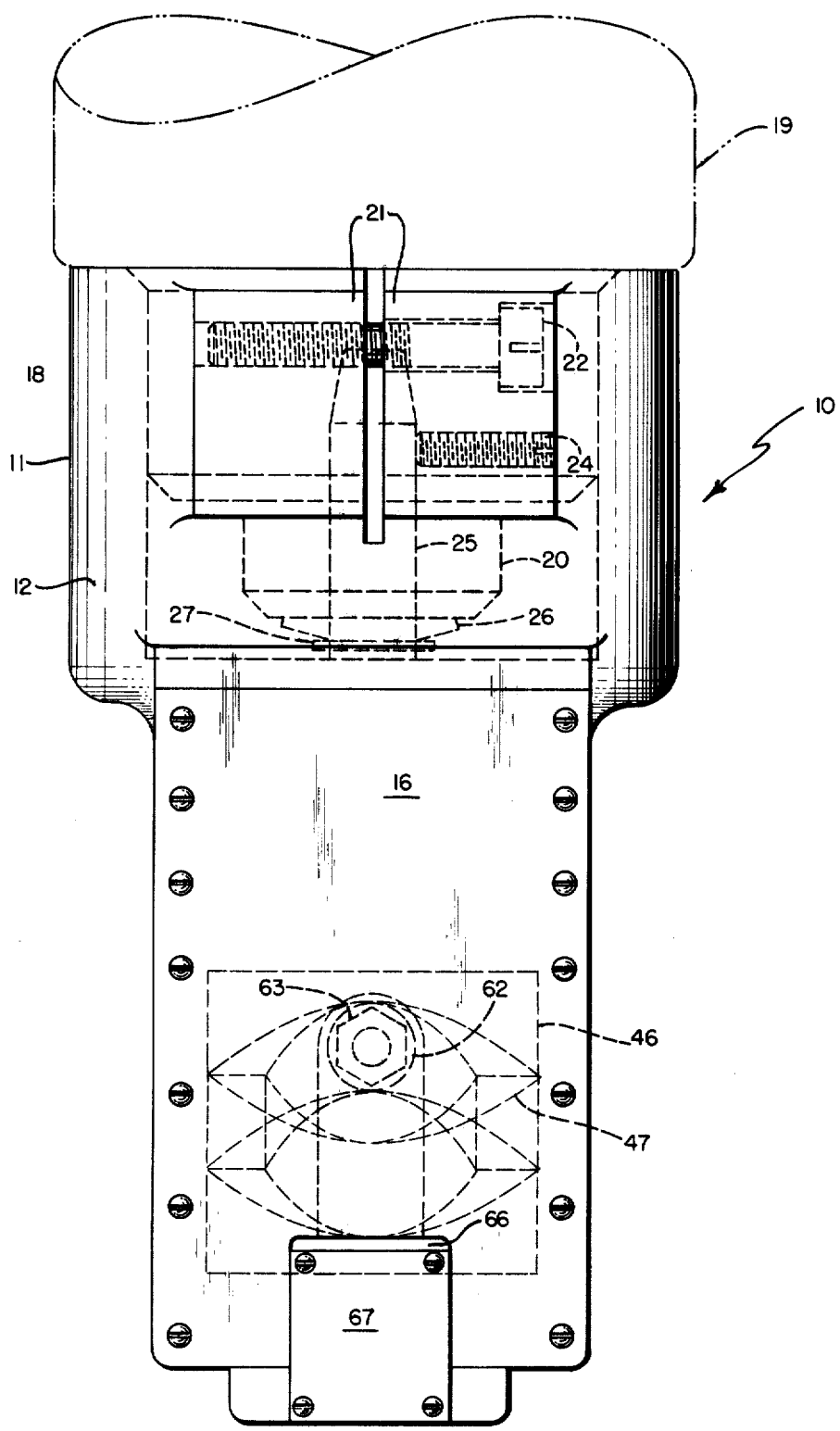
FIG. 2 is a front view of the tool attachment of FIG. 1.
Figure 4:
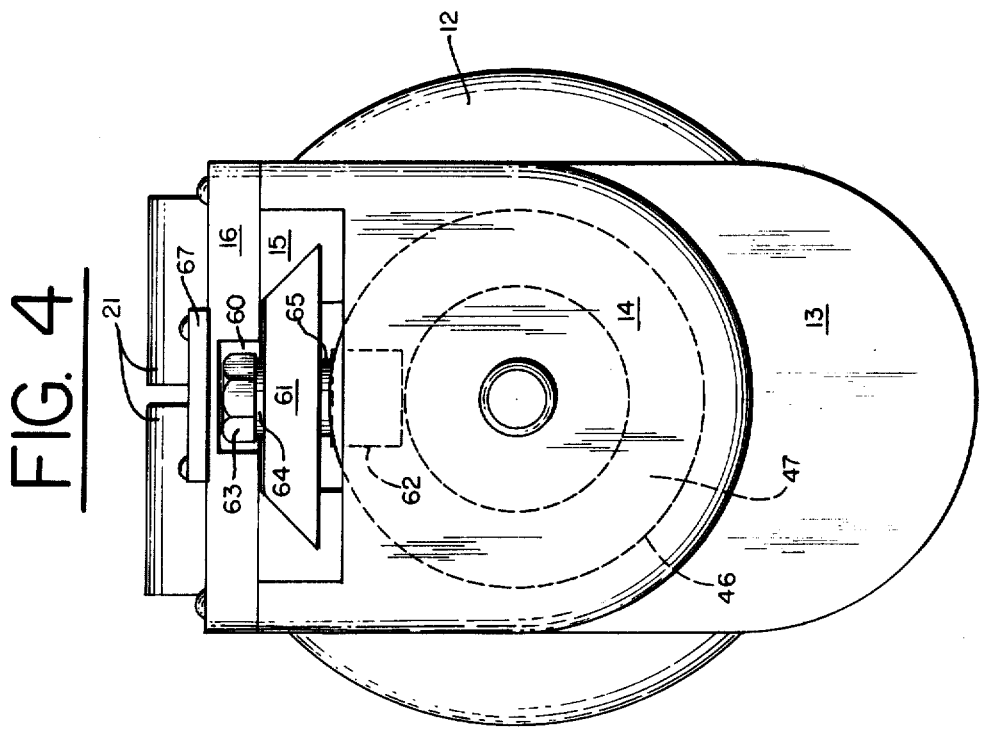
FIG. 4 is a bottom view of the tool attachment of FIG. 1.
Figure 3:
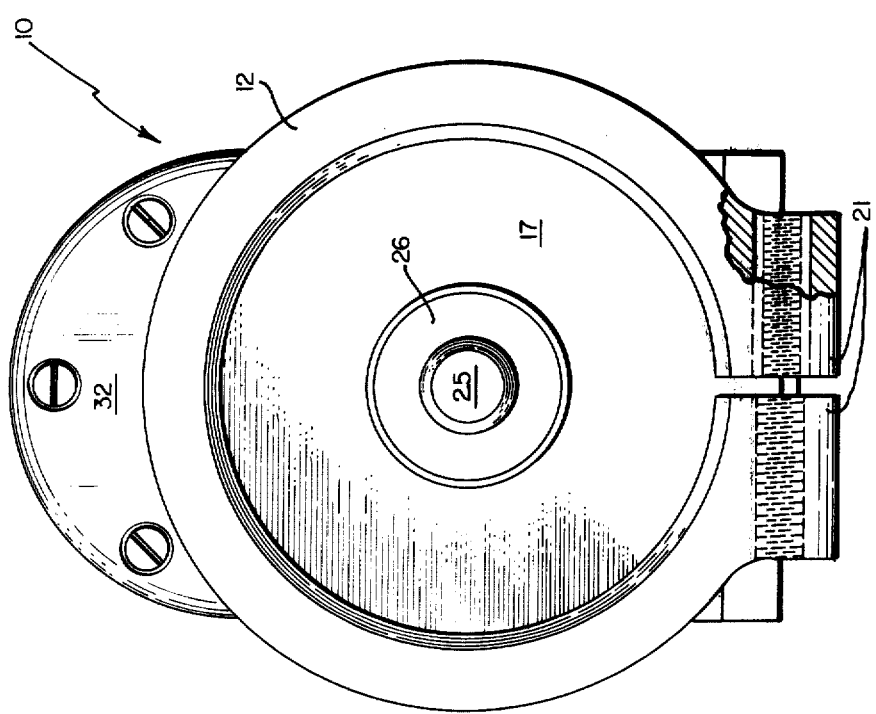
FIG. 3 is a top view of the tool attachment of FIG. 1.

Referring now to the drawings, and more particularly with reference to FIG. 1, the reference numeral 10 denotes generally the milling machine tool attachment of the present invention. The housing 11 of said tool attachment 10 comprises a plurality of discrete members including an upper member 12, a gear box 13, a lower member 14, a ram guide 15, and a cover plate 16. The overall configuration of housing 11 is substantially U-shaped as illustrated in the top and bottom views of FIGS. 3 and 4 and in the horizontal cross-sectional view of FIG. 6. Returning to FIG. 1, upper housing member 12 contains a cylindrical cavity 17 adapted to receive the fixed spindle column 18 of a conventional milling machine head 19 and its rotating spindle 20 which rotates within spindle column 18. Peripherally disposed around cavity 17 on upper housing member 12 are cylindrical clamping means comprising clamp 21 adapted to secure tool attachment 10 to spindle column 18 by means of an adjustable threaded screw 22, illustrated in FIG. 2, and immediately below said clamp 21 a threaded hole 23 provided with a screw 24, illustrated in FIG. 2, to permit the expansion of housing 11 when clamp 21 is unlocked for easy removal of tool attachment 10 from milling machine spindle column 18. When tool attachment 10 is attached to milling machine head 19, input shaft 25 is inserted into collet 26 which is located at the bottom of rotating spindle 20 to input shaft 25. A retaining ring 27 holds input shaft 25 in the proper position. The base 28 of upper housing member 12 extends horizontally inward and has a circular aperture 29 in which a radial bearing 30 is placed. The upper portion of input shaft 25 passes through the inner rotating race 31 of bearing 30 to engage collet 26 in axial relation to rotating spindle column 20 and a fixed spindle column 18. Base 28 also serves as the top of gear box 13.

The speed of rotation of shaft 25 is often too high for many broaching operations. For this reason a gear reduction system is included within this embodiment. Gear box 13 which is mounted to upper housing member 12 has a lateral extension on one side which meets shoulder 32 of upper housing member 12. The lower end of input shaft 25 terminates in a gear 33 which engages gear 34 which, in turn, engages gear 35 which, in turn engages gear 36. Gears 33 and 34 are horizontally situated within gear box 13 and supported be vertical shaft 37. The two ends of vertical shaft 37 fit into the inner rotating races 38, 39 of radial bearings 40, 41. Bearing 40 is mounted in base 28 of upper housing member 12 and bearing 41 is mounted in the base 28 of gear box 13. All said gears 33, 34, 35 and 36 are secured to their respective shafts by means of square keys 42, 43, and 44, and in addition to set screws (not shown). Retaining ring 70 is used to hold tapered bearing 53 in place in base of gear box 13. Retaining ring 71 is used to hold radial bearing 30 in place in base 28 of upper housing member 12.

Lower housing member 14 has a cylindrical cavity 45 and situated within said cavity is cylindrical cam 46 having a continuous peripheral angularly disposed cam groove 47 in the form of a helix curve. Cam 46 is securely fitted to an output shaft 48 by a locking means comprising two set screws (not shown) and tapered locking pins 49, 50. The bottom of gear box 13 has a circular aperture 51 concentric with spindle column 18 and rotating spindle 20. Said aperture 51 receives a tapered bearing 52, through which the upper portion of output shaft 48 passes. Output shaft 48 is closely fitted to the inner rotating race 53 of the tapered bearing 52.

The lower portion of output shaft 48 passes outwardly through the inner rotating race 54 of tapered bearing 55 situated about the periphery of circular aperture 56 in the base 57 of lower housing member 14. Cylindrical cam 46 rotates with the rotation of output shaft 48. The purpose for the protrusion of output shaft 48 through the base 57 of lower housing member 14 is to allow a dial indicator instrument 80 to be placed within cylindrical cavity 58. From this point it is possible to indicate reference positions accurately.

Dial indicator instrument 80 could be a Starrett model no. 711G or equivalent, and is adjustable to sweep any hole or surface within its range. Dial indicator 80 is inserted in cylindrical cavity 58 and retained therein by any conventional means. Since the reference point of dial indicator 80 is concentric and in line with the vertical axis of tool attachment 10, when the center point of a work piece is indicated by dial indicator 80, this center point is in line with the vertical axis of tool attachment 10.

Figure 6:
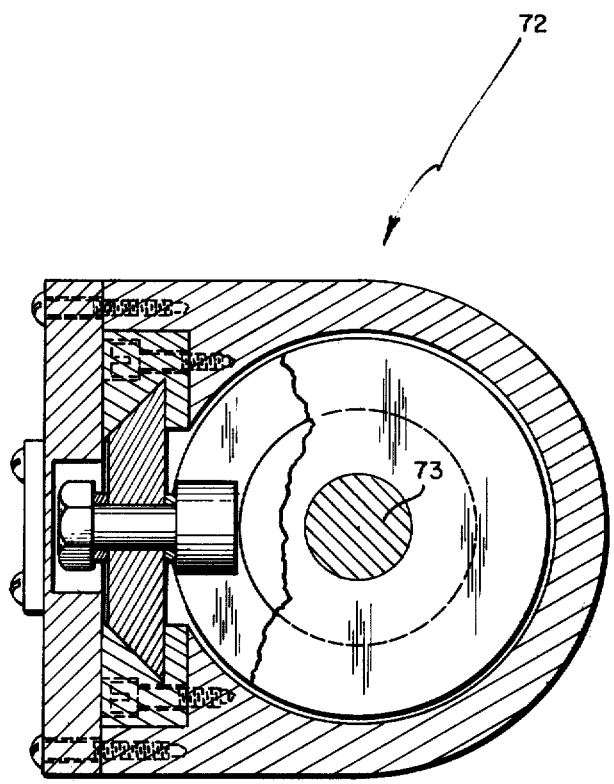
FIG. 6 is a horizontal transverse sectional view taken along lines 6—6 of FIG. 5.
Figure 7:
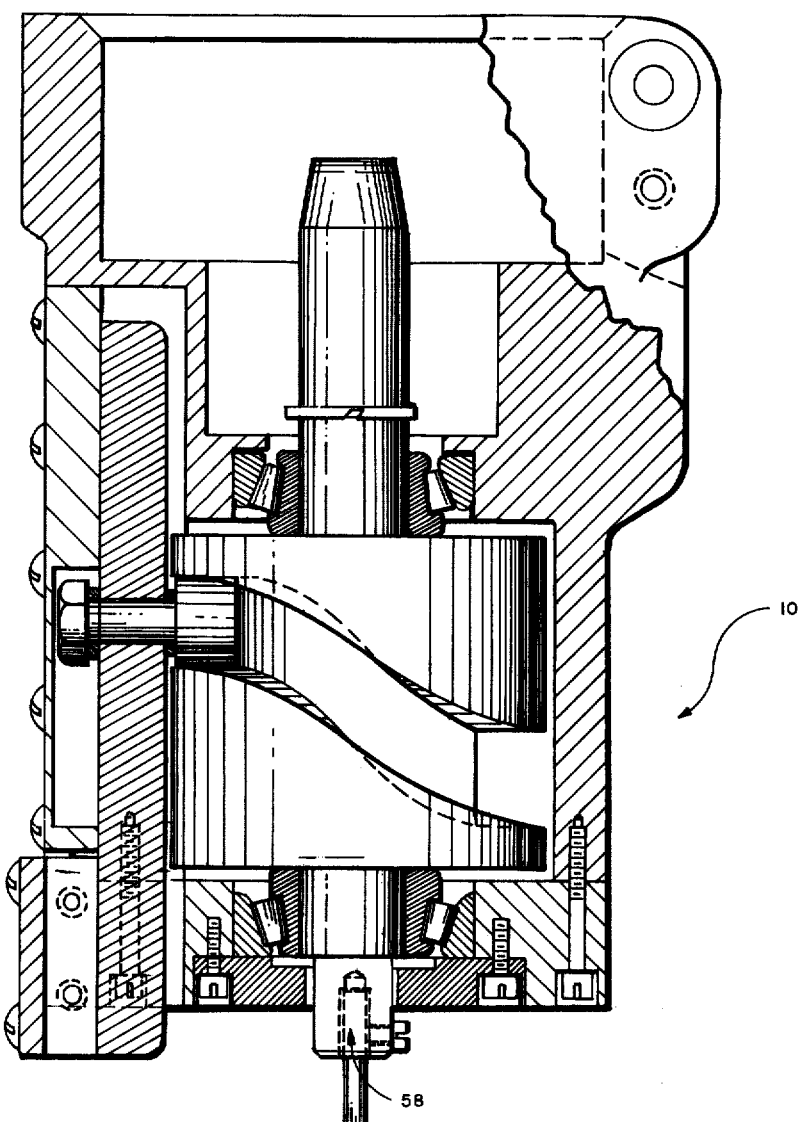
FIG. 7 the front view of FIG. 5 with the dial indicator in position.

Ram guide 15 is a female trapezoidal member which is fixably attached to the front face of gear box 13, extending vertically downward to the bottom of tool attachment 10. Its lower portion is attached to the front face of lower housing member 14, as shown in FIGS. 1 and 6.

Ram guide 15 has a rectangularly shaped aperture 59 and its interior vertical side coextensive with the vertical dimension of cylindrical cam 46 to prevent interference of reciprocating parts. Front cover plate 16 is fixably secured to the front face of lower housing member 14, gear box 13 and upper housing member 12. As described earlier, cover plate 16 has 16 has a rectangular recess 60 to allow for clearance of nut 63 as it reciprocates, as shown in FIGS. 1, 4, 5 and 6.

Figure 8A:
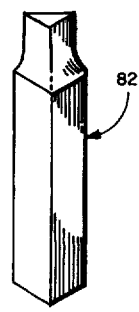
FIGS. 8a and 8b are typical broaching tool bits.
Figure 8B:
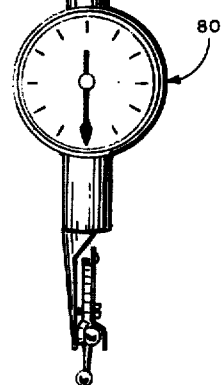

FIGS. 8a and 8b illustrate respectively a triangular tool bit 82 and a rectangular tool bit 84. These tool bits are inserted in slot 66, as indicated above. Since the center joint of the work piece is known through use of dial indicator 80 and the distance from the center point of tool attachment 10 to tool bit 82 is known, it then becomes a simple calculation to position the tool bit 82 over the precise position on which it should cart the work piece.

After securing tool attachment 10 to spindle 18 of a milling machine head 19, the rotating members of tool attachment 10, namely input shaft 25, gears 33, 34, 35 and 36, output shaft 48 and cylindrical cam 46, are dependent upon the rotational motion of rotating spindle 20 for their rotational motion. When rotating spindle 20 is rotating, input shaft 25, which is locked thereto by means of collet 26 also rotates and turns in the inner race 31 of radial bearing 30. The rotational movement of input shaft 25 drives gear 33, transmitting rotational motion through the gear train, 33, 34, 35 and 36 at a three-to-one reduction in speed to output shaft 48. Cylindrical cam 46 which is fixably attached to output shaft 48 rotates between tapered bearings 52 and 55. The rotary motion of cam 46 is converted to reciprocal motion of ram 61 by means of cam follower 62 which travels in helix curved cam groove 47. Ram 61 reciprocates slidably between ram guide 15 and cover plate 16, and with a tool bit 82 secured in slot 66, tool 10 will perform broaching operations.

Figure 5:
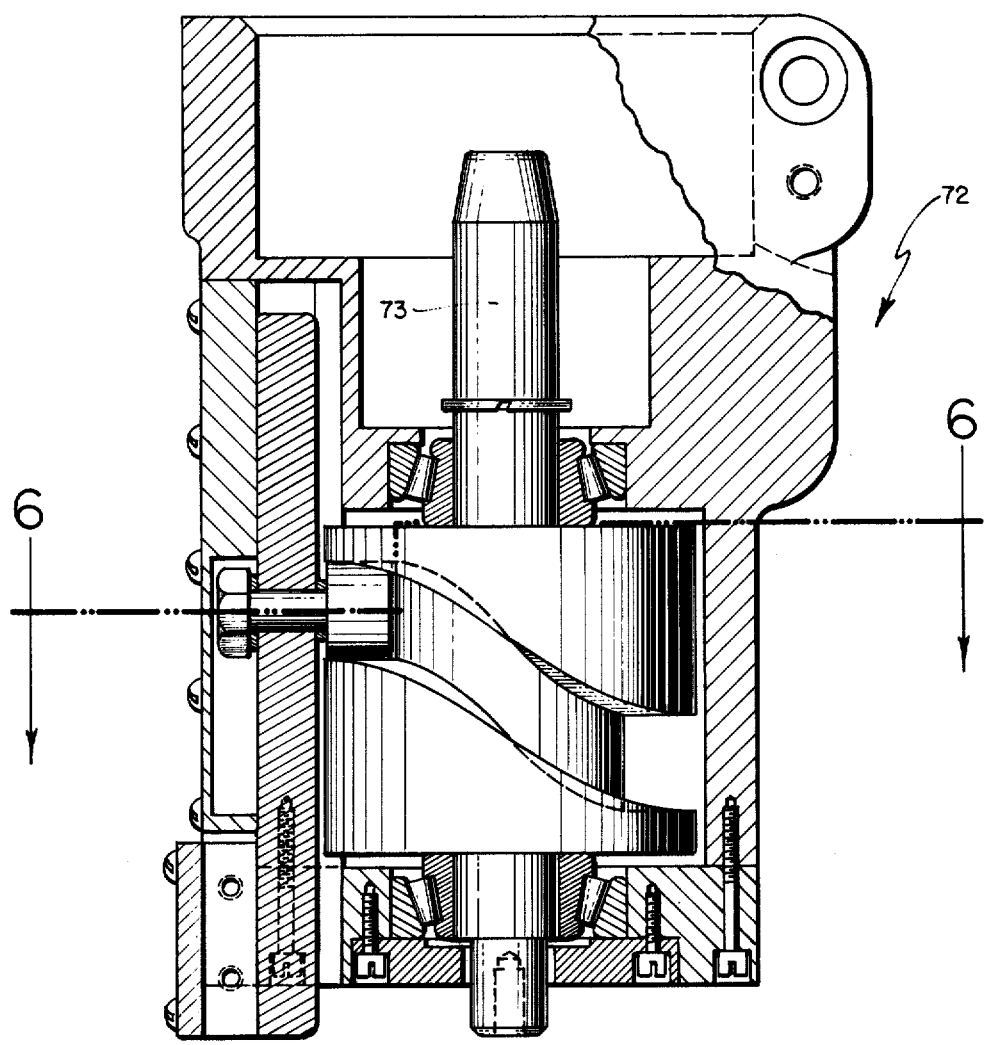
FIG. 5 is a vertical transverse sectional view of an alternative embodiment of the tool attachment of the present invention without the gear reduction feature.

An alternate configuration of the above described tool attachment for milling machines is illustrated in FIG. 5. Tool attachment 72 differs from the previously described tool attachment 10 of FIG. 1 in that tool attachment 72 does not have a gear reduction means to reduce the rotational speed of its drive shaft 73. This eliminates all components associated with the gear train and provides a tool attachment of great simplicity of construction.

In both configurations relatively small tool bits may be utilized to perform precision broaching operations with a dial indicator guide utilized for precise positioning of the tool bits on the work piece.

Although a tool attachment for milling machines has been described in detail, the basic concept of the invention is not limited thereto. The basic teaching of the invention may be employed in a variety of applications requiring utilization of special attachments to milling machines for specialized milling and broaching operations. Although a preferred embodiment has been shown and described herein, it is understood that the invention is not limited thereto, and that numerous changes and substitutions may be made without departing from the spirit of the invention.

I claim:

1. A tool attachment for milling machines to permit reciprocating cutting operations on metallic materials comprising:
   a housing;
   a cylindrical cavity in the upper portion of said housing adapted to receive the spindle column of a milling machine head, providing a rotatable drive shaft received in said spindle column for said tool attachment;

a screw-operated clamp to secure said housing to said milling machine head;

an expansion screw to expand said housing for release of said housing from said milling machine head; said clamp and said expansion screw providing means for connection and release of said tool attachment to the head of a milling machine;

a cam connected to said rotatable drive shaft having a helix curve grooved on said cam;

a reciprocating ram slidably received in said housing;

a cam follower on said reciprocating ram adapted to be slidably received in said cam groove; said cam and cam follower providing means for conversion of the rotary motion of said shaft to the reciprocal motion of said ram;

a tool bit having a shaped end for cutting a geometric shape;

a slot in said reciprocating ram adapted to receive said tool bit;

a support plate to cover said slot and hold said tool bit in position;

means for securing said support plate in position;

a shaft extending from said cam and being coaxial with said drive shaft;

a cylindrical cavity in the base of said shaft extending from said cam adapted to receive a dial indicator instrument;

a dial indicator instrument having a cylindrical shaft adapted at its upper end to be received into said cylindrical cavity, the measuring element of said indicator extending downward to a horizontal plane in alignment with the lower end of a tool bit in said ram;

means for securing said indicating instrument in said cavity;

said indicator instrument being visible to the operator and capable of indicating the precise center of a work piece.

2. A tool attachment for milling machines as defined in claim 1 wherein said attachment further includes a shaft having two gears to accomodate a gear reduction system for reducing the speed of said reciprocating ram comprising:

a plurality of meshed gears forming a gear train;

said drive shaft supporting the first of said gears;

a lower shaft linked to the last of said gears and to said cylindrical cam, said gear reduction system providing a reduction of three to one from the rotational speed of said milling machine.

* * * * *